United States Patent [19]

Hollaway, Jr.

[11] 4,123,946
[45] Nov. 7, 1978

[54] ENDLESS POWER TRANSMISSION BELT AND METHOD OF MAKING SAME

[75] Inventor: Gerald C. Hollaway, Jr., Springfield, Mo.

[73] Assignee: Dayco Corporation, Dayton, Ohio

[21] Appl. No.: 793,102

[22] Filed: May 2, 1977

[51] Int. Cl.² .......................... F16G 1/00; B29D 17/00
[52] U.S. Cl. .................................. 74/231 P; 74/233; 156/137
[58] Field of Search ................ 74/231 P, 233, 234; 156/137, 142

[56] References Cited

U.S. PATENT DOCUMENTS

| | | | |
|---|---|---|---|
| 2,773,540 | 12/1956 | Waugh | 156/142 X |
| 3,031,364 | 4/1962 | Perkins | 156/137 |
| 3,987,684 | 10/1976 | Fisher et al. | 74/233 |

Primary Examiner—Leonard H. Gerin
Attorney, Agent, or Firm—Reuben Wolk

[57] ABSTRACT

An endless power transmission belt and method of making same is provided wherein such belt is defined by a helically wound elongated strip of polymeric material having load-carrying means extending throughout its length with the strip having adjoining turns thereof bonded together so that the polymeric material thereof is a homogeneous mass and the belt is a unitary structure.

20 Claims, 10 Drawing Figures

ENDLESS POWER TRANSMISSION BELT AND METHOD OF MAKING SAME

BACKGROUND OF THE INVENTION

Endless power transmission belts are widely used throughout industry and the manufacture and sale of such belts is highly competitive.

One comparatively economical technique for forming a plurality of endless belts is to define an uncured belt sleeve on a drum followed by curing, cooling and cutting such a sleeve to define a plurality of belts. With this technique, the usual practice is to build up a plurality of layers on the drum in various arrangements and such layers include fabric layers, platform layers, one or more layers of load-carrying means, cushion layers for the load-carrying means, and the like. The build up or placement of each layer on a drum is time consuming and increases the cost of its belt sleeve and belts made from same. In addition each layer of a belt sleeve is usually a layer for a special purpose which, of itself, increases the cost of the belt sleeve and belts made from same.

SUMMARY

It is a feature of this invention to provide a simple and reliable endless power transmission belt of optimum economy.

Another feature of this invention is to provide a belt of the character mentioned defined by a helically wound elongated strip of polymeric material having load-carrying means extending throughout its length with the strip having adjoining turns thereof bonded together so that the polymeric material thereof is a homogeneous mass and the belt is a unitary structure.

Another feature of this invention is to provide a belt of the character mentioned having load-carrying means in the form of a load-carrying cord which is embedded in the polymeric material and in which the polymeric material serves as a matrix for the helically wound cord.

Another feature of this invention is to provide a belt of the character mentioned in which the polymeric material serves as a matrix for a plurality of fibers embedded therein in a random manner.

Another feature of this invention is to provide an improved method of making endless power transmission belts of the character mentioned substantially automatically employing a minimum of method steps.

Another feature of this invention is to provide an improved method of making endless power transmission belts substantially automatically by continuously extruding substantially uncured polymeric material and load-carrying means in a substantially simultaneous manner to define an elongated strip of polymeric material having the load-carrying means extending throughout its length and helically winding the strip thus defined on a drum to define a belt sleeve which is then cured, cooled, and cut to define a plurality of belts in accordance with this invention.

Another feature of this invention is to provide an improved method of making a belt of the character mentioned employing load-carrying means in the form of a helically wound load-carrying cord.

Another feature of this invention is to provide an improved method of making an endless power transmission belt of this invention employing a plurality of strength fibers which are embedded in polymeric material and oriented therein simultaneously with forming such material into a strip used to make a belt sleeve.

Accordingly, it is an object of this invention to provide an endless power transmission belt and method of making same having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DETAILED DESCRIPTION

Figure 4:
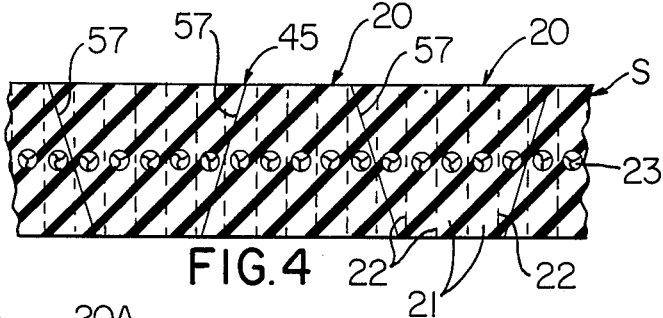
FIG. 4 is a cross-sectional view of a part of the cured or cooled belt sleeve of FIG. 3 showing the manner such sleeve is cut to make a plurality of endless power transmission belts of one exemplary embodiment of the belt of this invention.

Reference is now made to FIG. 4 of the drawing which illustrates a fragmentary portion of a belt sleeve defined in accordance with the method of this invention and such sleeve has been suitably cut, as will be subsequently described, to define a plurality of endless power transmission belts of one exemplary embodiment of this invention and each belt is designated by the same reference numeral 20. Each endless power transmission belt 20 is defined by a helically wound elongated strip designated by the reference numeral 21 with dotted lines 22 being shown on the drawing to indicate adjoining interfaces or surfaces of the turns of the strip. It will be appreciated that in the final belt such interfaces do not exist because the polymeric material of the belt cures into a homogeneous mass; however, such dotted lines 22 are presented in this disclosure for ease of presentation and understanding of the invention.

The belt 20 is defined by the elongated strip 21 of polymeric material having load-carrying means in the form of a helically wound load-carrying cord 23 extending throughout its length. The belt 20 is of trapezoidal cross-sectional outline and has its load-carrying cord 23 disposed midway between its inside and outside surfaces whereby such belt is a central neutral axis or a CNA belt. The strip 21 has adjoining turns thereof bonded or cured together so that the polymeric material thereof, which is designated generally by the reference numeral 24, is a homogenous mass, as indicated above, and the belt is a unitary structure. The load-carrying cord 23 may be any suitable cord employed in the art for this purpose.

The polymeric material of the exemplary belt 20 is shown by cross-hatching in the drawing as a rubber compound and such rubber compound serves as a matrix for the load-carrying means or helically wound load-carrying cord 23. The polymeric material 24 may be any suitable elastomer such as natural or synthetic rubber, or a thermoplastic material which is described below.

Figure 5A:
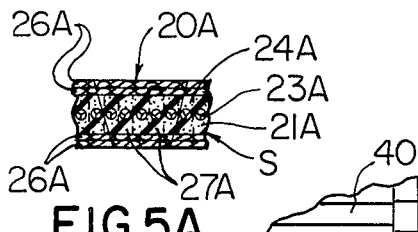
FIG. 5A is a view drawn to a smaller scale and similar to FIG. 4 applicable to the belt sleeve of FIG. 5.
Figure 6A:
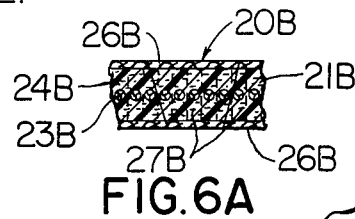
FIG. 6A is a view similar to FIG. 5A applicable to the belt sleeve of FIG. 6.
Figure 7:
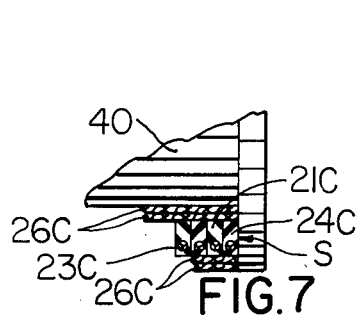
FIG. 7 is a view similar to FIG. 5 illustrating additional method steps which may be employed with the steps of FIG. 1 to make another belt sleeve used to make a plurality of endless belts of another exemplary embodiment of the belt of this invention.
Figure 7A:
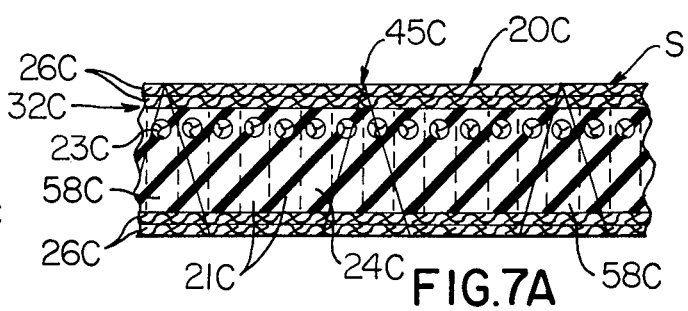
FIG. 7A is a view similar to FIG. 4 applicable to the belt sleeve of FIG. 7.

Other exemplary embodiments of the belt of this invention are illustrated in FIGS. 5A, 6A, and 7A of the drawings. The belts illustrated in FIGS. 5A, 6A, and 7A are similar to the belt 20; therefore, such belts will be designated by the reference numerals 20A, 20B, and 20C respectively and representative parts of each belt which are similar to corresponding parts of the belt 20 will be designated in the drawing by the same reference numeral as in the belt 20 (whether or not such representative parts are mentioned in the specification) followed by the associated letter designation, either A, B, or C, and not described again in detail. Only those component parts of each belt 20A, 20B, and 20C which are different from corresponding parts of the belt 20 will be designated by a new reference numeral also followed by the associated letter designation and described in detail.

The belts 20A, 20B, and 20C are made employing the method steps of the method employed in making the belt 20, which method will be described in detail subsequently, together with additional steps as required to provide the belts 20A, 20B, and 20C.

The belt 20A is also a CNA belt made from an elongated strip 21A of material with an elongated cord 23A embedded therein; however, belt 20A differs from the belt 20 in that it has a plurality of two fabric layers 26A carried by each parallel surface of the polymeric or rubber material 24A defining its central part with two of such layers defining the outside portion of the belt and two of such layers defining the inside portion of such belt. In addition the belt 20A has a plurality of elongated fibers 27A embedded in a random manner within the rubber matrix material 24A and the fibers have their elongated dimensions or axes disposed substantially parallel to the longitudinal axis of the belt 20A.

The belt 20B is also a CNA belt made from an elongated strip 21B of material with an elongated cord 23B embedded therein. However, belt 20B differs from belt 20 in that the polymeric material 24B is a matrix in the form of a thermoplastic material indicated by suitable cross-hatching. The belt 20B also has a plurality of elongated fibers randomly disposed in the thermoplastic material and the fibers 27B are disposed with their elongated axes transverse of the longitudinal axis of the belt 20B. The belt 20B further differs from the belt 20 in that it has a single fabric layer carried by each parallel surface of the thermoplastic material 24B defining its central part.

The belt 20C of FIG. 7A differs from the belt 20 in that it has a plurality of two fabric layers 26C carried by each parallel surface of the rubber material 24C defining its central part and has its load-carrying means in the form of a helically wound load-carrying cord 23C disposed more closely adjacent the one pair of fabric layers 26C adjacent the outside surface of the belt, as indicated at 32C, whereby the belt 20C is of a more conventional construction. The belt 20C is thus a more conventional trapezoidal belt and is made from an elongated strip 21C of material having the load-carrying cord 23C embedded therein more closely to one end edge of the rectangular cross-sectional outline of the strip than to the opposite end edge.

Figure 1:
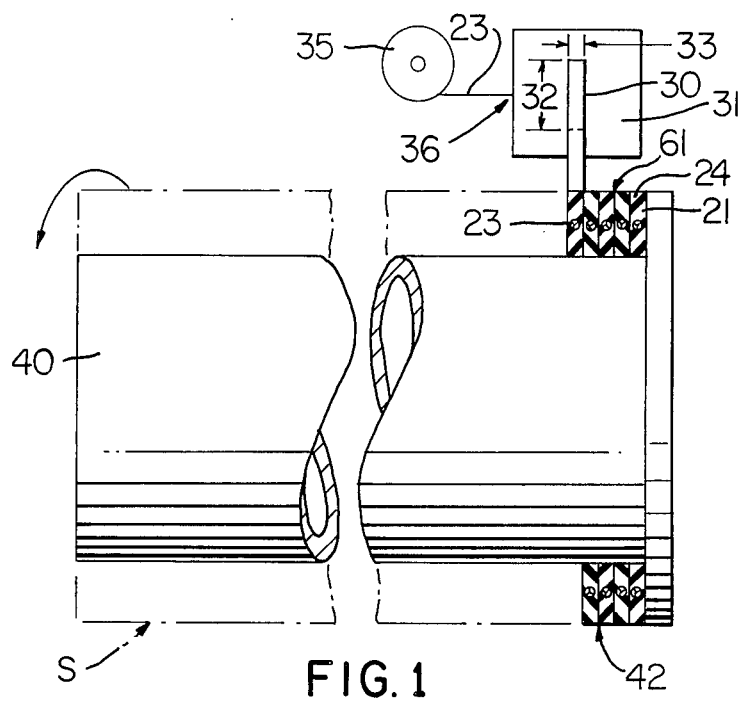
FIG. 1 is a view with parts in elevation, parts in cross section, parts shown schematically, and parts broken away highlighting a step of the method of this invention enabling a belt sleeve (from which belts of this invention are cut) to be made in a substantially continuous process.

Reference is now made to FIG. 1 of the drawing which illustrates a method step of this invention which is employed in making every embodiment of the endless power transmission belt of this invention disclosed herein and such step enables a plurality of belts to be made substantially automatically in a comparatively continuous process. In particular, the method comprises the steps of continuously extruding a substantially uncured polymeric material 24 and load-carrying means in the form of a load-carrying cord 23 in a simultaneous manner through an extrusion orifice 30 of an extrusion apparatus or extruder 31 to define an elongated strip 21 of a polymeric material having the load-carrying cord 23 extending throughout its length. The extruder 31 is of known conventional construction and the orifice 30 is rectangular having a comparatively larger height 32 than its width 33 whereby the strip 21 is of a corresponding rectangular outline having width 33 and height 32.

The load-carrying cord 23 is suitably supported for unwinding rotation on a spool 35 thereof and introduced into the extruder 31 as indicated at 36. The cord 23 is suitably turned or oriented relative to the extrusion orifice 30 within the extruder 31 so that extrusion of the polymeric material 24 through the orifice 30 results in the formation of the strip 21 with the load-carrying cord 23 embedded therein. The flow of material 24 through orifice 30 pulls the cord 23 with it causing simultaneous embeddment thereof.

Substantially simultaneously with extrusion of substantially uncured strip 21 with cord 23 therein such strip 21 is helically wound on a drum 40 of the type which is well known in the art of making endless power transmission belts. The winding action is achieved by rotating the drum as indicated by the arrow 41 such that the turns of the strip are disposed in adjoining relation as shown at 42 to define an uncured and uncovered, i.e., free of inside and outside covers, belt sleeve which is designated by the reference letter S, and after the sleeve S is completed it extends the full axial length of the drum 40.

Figure 2:
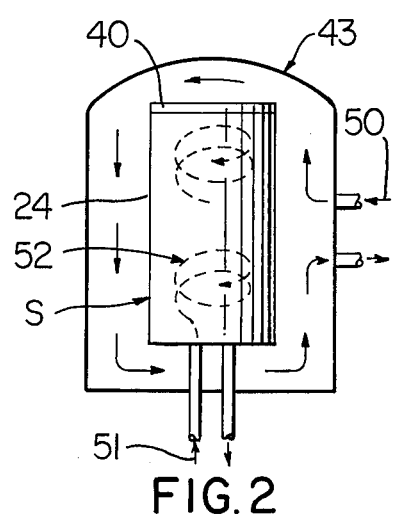
FIG. 2 is a schematic illustration showing the belt sleeve formed in accordance with FIG. 1 being cured in a curing device.

The uncovered and uncured sleeve thus defined is then suitably cured in a curing device 43 as illustrated in FIG. 2 to define a cured belt sleeve so that the polymeric material or rubber compound 24 thereof defines a homogeneous cured mass. During the curing action the interfaces of adjoining turns of the strip bond together and are eliminated.

Figure 3:
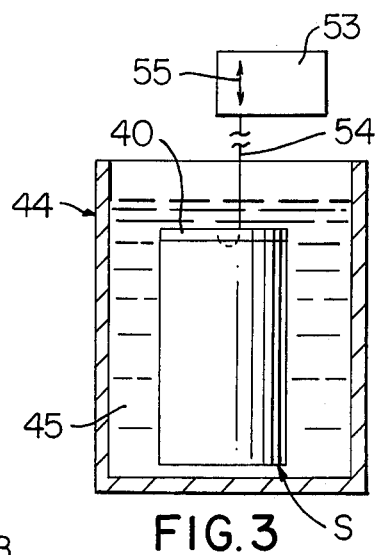
FIG. 3 is a schematic illustration showing the step of cooling the sleeve of FIG. 2 after curing thereof.

The sleeve S is then suitably cooled in a cooling tank 44 as illustrated in FIG. 3 and following cooling the sleeve is suitably cut utilizing any technique known in the art with the cutting of sleeve S being achieved as illustrated in FIG. 4 employing a cutting device indicated by an arrow schematically representing a cutting knife 45 to define a plurality of belts 20 of this invention. The manner in which the belts 20 are cut substantially without scrap will be described later.

As indicated earlier the elongated extruded strip 21 is of rectangular cross-sectional outline and the load-carrying cord 23 is disposed centrally therein so that after curing and cooling of the sleeve as shown in FIGS. 2 and 3 respectively the load-carrying cord 23 is located midway between the inside and outside surfaces of the sleeve. Accordingly, once the sleeve S is cut as shown in FIG. 4 each belt 20, 20A, and 20B has its load-carrying cord disposed midway between its inside and outside surfaces and is in the form of a so-called central-neutral axis belt or a CNA belt.

The curing step illustrated in FIG. 2 of the drawings is achieved by placing the drum 40 with the sleeve S thereon in the curing device 43 and curing or vulcanizing is achieved utilizing techniques known in the art. For example, curing is achieved by introducing steam, indicated by arrows 50, under controlled temperatures and pressures into and out of device 43 and circulated around the sleeve S and drum. Steam, indicated by arrows 51, under controlled temperatures and pressures is also introduced within the drum as illustrated at 52 whereupon curing or vulcanization of the sleeve S takes place by application of steam around the outside of the sleeve S and within the drum 40. The curing device 43 may be of any suitable type used in the art, such as a pot heater, for example.

The cured or vulcanized sleeve S is then cooled utilizing any suitable technique known in the art and as shown in FIG. 3 of the drawing in this example of the invention is suitably cooled in a container 44 through which cold tap water 56 is circulated in a continuous manner. The drum 40 with the sleeve S thereon is submerged in the water 56 by lowering the drum 40 and sleeve S utilizing an actuator 53 having a fastening device 54 extending therefrom and the actuator 53 is such that it can move the drum 40 with the sleeve S thereon into and out of the cold tap water 56 as indicated by the double arrow 55.

The sleeve S is then suitably cut as illustrated in FIG. 4 and the cutting action may be achieved with the sleeve S supported on the drum 40 which may be provided with means for rotating same on centers and with a suitable cylindrical cutting mat thereon of known construction. The sleeve S after having been cured and cooled may also be removed from the drum 40 and then placed on a suitable cutting mandrel in accordance with techniques known in the art and suitably cut.

However, regardless of whether the sleeve is cut on the drum 40 or removed from such drum and placed on a suitable cutting mandrel, the cutting action is provided by a suitable cutting knife which may be in the form of a circular cutting knife 45 indicated schematically as mentioned earlier. The circular cutting knife may be rotated by a suitable drive mechanism while rotating the mandrel assembly on which the sleeve S is supported with the knife 45 in cutting engagement with the sleeve S to provide the cutting action.

The cutting knife 45 provides a plurality of what will be referred to as balanced cuts along the length of the sleeve S and a representative few of such cuts are designated by the same reference numeral 57 in FIG. 4. The balanced cuts 57 define non-parallel sides of associated trapezoidal belts 20. The cuts 57 are suitably spaced and inclined in alternating directions along the length of the sleeve S to define a plurality of belts 20 without scrap or loss of material. The cuts 57 are such tht alternating belts along the sleeve S upon being turned inside out are identical to the other belts, i.e., those maintained right side out without inversion.

The elongated uncured polymeric strip 21 with the load-carrying cord 23 disposed therein is wound such that prior to curing thereof the strip has adjoining side surfaces as indicated typically at 61 in FIG. 1 for certain typical turns. However, following curing or vulcanization, and as indicated earlier, the helically wound strip defines the sleeve S as a homogeneous mass of polymeric material with the load-carrying cord disposed integrally therethrough.

Figure 5:
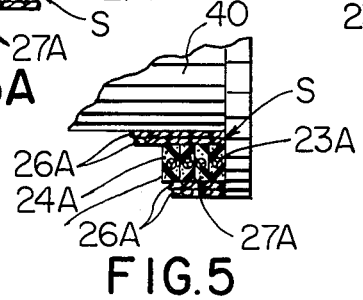
FIG. 5 is a view similar to the lower right-hand corner of FIG. 1 illustrating additional method steps which may be employed with the steps of FIG. 1 to make another belt sleeve used to make a plurality of endless belts of another exemplary embodiment of the belt of this invention.

The method steps shown in FIGS. 1, 2, 3, and 4 for forming the belt 20 are used to define the belts 20A, 20B, and 20C illustrated in FIGS. 5A, 6A, and 7A. Basically the formation of the belt sleeve S, see FIG. 5, used to define the belt 20A comprises the further steps of first wrapping a plurality of two layers 26A around the drum 40. The rectangular strip 21A having load-carrying cord 23A centrally disposed therein and also having a plurality of elongated fibers 27A disposed therein is then extruded using extruder 31 and wrapped around the layers 26A on the drum 40. The fibers 27A are oriented during the extrusion process such that their elongated dimensions are disposed substantially parallel to the longitudinal axis of their associated load-carrying cord 23A and belt 20A. A plurality of two fabric layers 26A are then wrapped around and against the strip 21A as shown in FIG. 5 to define the sleeve S which is then suitably cured as shown in FIG. 2, cooled as shown in FIG. 3, and cut in a similar manner as described in connection with FIG. 4 to define a plurality of belts 20A as shown in FIG. 5A.

Figure 6:
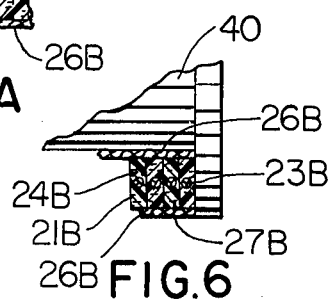
FIG. 6 is a view similar to FIG. 5 illustrating method steps which may be employed with the steps of FIG. 1 to make another belt sleeve used to make a plurality of endless belts of another exemplary embodiment of the belt of this invention.

The belt 20B of FIG. 6A is also made utilizing the method steps illustrated in FIGS. 1-4, with only single layers of fabric 26B being applied on opposite sides of the central mass as shown in FIG. 6 and in a similar manner as described for belt 20A. However, the polymeric material in this instance is in the form of a synthetic plastic material having a centrally disposed load-carrying cord 23B and having fibers 27B disposed therein so that such fibers 27B extend essentially transverse the longitudinal axis of the cord 23B and the belt 20B defined thereby. The fibers 27B are also preferably oriented during the extrusion process such that they are disposed in the above-described transverse arrangement.

The arrangement of the fibers 27A in strip 21A and its belt 20A and the arrangement of the fibers 27B in strip 27B and its belts may be achieved by premixing the fibers in the polymer in each instance and then employing either fixed or movable extrusion orifices upstream of orifice 30 to achieve the desired orientation. However, regardless of the technique employed the fibers are in each instance dispersed in a random manner substantially uniformly throughout the polymer.

The belt 20C of FIG. 7A is also made utilizing the method steps of FIGS. 1-4. Further, fabric layers 26C are built up on the drum 40 in a similar manner as described in connection with FIG. 5, see FIG. 7.

During the step of extruding strip 21C with its load-carrying cord 23C, the cord is introduced to the orifice 30 so that the polymeric strip 21C, when viewed in cross-section, has such cord closer to one end of the rectangular mass of the strip than to the other end. The sleeve S thus defined may be considered a more conventional sleeve having its load-carrying means or load-carrying cord 23C more closely adjacent the outside surface of the sleeve. The sleeve thus defined is then cured in a similar manner as shown in FIG. 2, cooled as shown in FIG. 3, followed by cutting thereof similar to the cutting described in connection with FIG. 4 but specifically as shown in FIG. 7A. In this instance the knife 45C is employed to provide more conventional cuts whereby wedges of scrap 58C are defined between immediately adjacent belts 20C. In each belt 20C, the load-carrying section and the load-carrying cord 23C is defined more closely adjacent the wider of the parallel sides of such belt as is typical of conventional power transmission belts. Instead of an elastomer, a thermoplastic material may be used as the polymeric matrix 24C of each belt 20C.

The fibers employed in the belts 20A and 20B may be any suitable fibers used in the art of making belts. Similarly, in the belt 20B the material defining the polymeric matrix 24B my be any suitable thermoplastic material which is used in belt-making. For example, the material may be an extrudable thermoplastic polyurethane elastomer, such as sold by Monsanto under the trade name "Texin"; or a thermoplastic elastomer such as sold by DuPont under the trade name "Hytrel".

The fabric layers utilized on the belts 20A, 20B, and 20C may be made of any suitable fabric material including woven, non-woven, knitted, double knitted, and the like.

The method of this invention enables formation of the major part of a belt sleeve, as shown in FIG. 1, in a substantially continuous process which lends itself to automation. This disclosed technique approaches the provision of a method of making the belt in a substantially continuous manner with minimum down time.

The formation and wrapping of an uncured strip of the character mentioned in a helically wound pattern about a drum, as shown in FIG. 1, is with the wrapping being achieved immediately as the material exits the extruder. Such immediate wrapping enables the formation of a sleeve of optimum quality because the interfaces of adjoining turns of the strip are sealed from maximum exposure to ambient air due to being covered immediately upon being freshly formed or exposed. With increased exposure time on adjoining turns of an uncured strip it has been found that there is a tendancy to reduce capability of adjoining surfaces of the strip to adhere to each other. Accordingly, it is apparent that the homogeneous character of the polymeric matrix material of the belts of this invention is superior to the homogeneous character of the matrix material used in similar belts defined using previous tecnhiques.

The basic extrusion apparatus 31 may be of any suitable conventional type known in the art and a basic extrusion apparatus may be located centrally relative to a plurality of drums similar to the drum 40 whereby a strip such as the strip 20 exiting such apparatus may be wound on one drum and once an entire sleeve S is defined thereon the strip 21 is cut and started on another drum simply by moving the cut end of the strip a few degrees to such other drum without stopping the extrusion apparatus 31 whereby a single extrusion apparatus may be used to maximum efficiency to service a plurality of drums.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt defined by a single continuous helically wound elongated strip of polymeric material having load-carrying means extending throughout its length, said strip having adjoining turns thereof bonded together so that said polymeric material thereof is a homogeneous mass and said belt is a unitary structure.

2. A belt as set forth in claim 1 in which said load-carrying means comprises a load-carrying cord.

3. A belt as set forth in claim 2 in which said belt has an outside surface and an inside surface, said helically wound load-carrying cord being disposed midway between said surfaces.

4. A belt as set forth in claim 2 in which said belt has an outside surface and an inside surface and said helically wound load-carrying cord is disposed closer to said outside surface than to said inside surface.

5. A belt as set forth in claim 1 in which said polymeric material is in the form of an elastomer.

6. A belt as set forth in claim 1 in which said polymeric material is in the form of a thermoplastic material.

7. A belt as set forth in claim 1 in which said polymeric material serves as a matrix for a plurality of fibers embedded therein in a random manner.

8. A belt as set forth in claim 7 in which said fibers are disposed essentially parallel to the longitudinal axis of said belt.

9. A belt as set forth in claim 7 in which said fibers are disposed substantially transverse the longitudinal axis of said belt.

10. A belt as set forth in claim 1 and further comprising at least one fabric layer adjoining said polymeric material and defining a portion of said belt remote from said load-carrying means.

11. A method of making endless power transmission belts comprising the steps of, continuously extruding a substantially uncured polymeric material and load-carrying means in a substantially simultaneous manner to define an elongated strip of said polymeric material having said load-carrying means extending throughout its length, helically winding said strip on a drum with turns thereof in adjoining relation to define an uncovered belt sleeve, curing said sleeve so that said polymeric material defines a cured homogeneous mass, cooling said sleeve, and cutting said sleeve to define a plurality of said belts.

12. A method as set forth in claim 11 in which said continuously extruding step comprises continuously extruding a load-carrying cord within a mass of polymeric material of rectangular cross-sectional outline.

13. A method as set forth in claim 12 in which said continuously extruding step comprises extruding said load-carrying cord centrally within said rectangular cross-sectional outline.

14. A method as set forth in claim 12 in which said continuously extruding step comprises continuously extruding said load-carrying cord closer to one end of said rectangular cross-sectional outline than to the other end.

15. A method as set forth in claim 13 in which said cutting step comprises cutting said sleeve by providing a plurality of balanced cuts along the length thereof, said cuts being spaced and inclined in alternating directions along the length of said sleeve, said cuts defining belts of trapezoidal cross-section along the length of said sleeve such that alternate belts along the length of said sleeve upon being turned inside out are identical to the other belts along said sleeve.

16. A method as set forth in claim 11 and comprising the further step of wrapping at least one fabric layer against said drum prior to said continuously extruding step and wrapping at least one fabric layer against said uncovered belt sleeve prior to said curing step.

17. A method as set forth in claim 11 comprising the further step of wrapping a plurality of fabric layers around said drum prior to said continuously extruding step and wrapping a plurality of fabric layers around said uncovered belt sleeve prior to said curing step.

18. A method as set forth in claim 11 in which said curing step comprises placing said drum and sleeve in a curing device and curing said sleeve using steam under controlled temperatures and pressures.

19. A method as set forth in claim 17 in which said cooling step comprises cooling said sleeve employing a cooling fluid.

20. A method as set forth in claim 17 in which said cooling step comprises cooling said sleeve by immersing said sleeve in a container having cold tap water.

* * * * *